United States Patent [19]
Jin et al.

[11] Patent Number: 5,854,802
[45] Date of Patent: Dec. 29, 1998

[54] SINGLE LONGITUDINAL MODE FREQUENCY CONVERTED LASER

[76] Inventors: Tianfeng Jin, 3373 Gypsum Rd., Reno, Nev. 89503; Reinhard F. Bruch, 709 Putnam Dr., Reno, Nev. 89503

[21] Appl. No.: 868,044

[22] Filed: Jun. 3, 1997

Related U.S. Application Data

[60] Provisional application No. 60/019,155 Jun. 5, 1996.

[51] Int. Cl.[6] .................................................. H01S 3/10
[52] U.S. Cl. ............................. 372/22; 372/34; 372/75; 372/97
[58] Field of Search ........................... 372/21, 22, 75, 372/97, 34

[56] References Cited

U.S. PATENT DOCUMENTS

| | | | |
|---|---|---|---|
| 4,701,929 | 10/1987 | Baer et al. | 372/71 |
| 4,942,582 | 7/1990 | Kintz et al. | 372/18 |
| 5,052,815 | 10/1991 | Nightingale et al. | 372/94 |
| 5,164,947 | 11/1992 | Lakas et al. | 372/22 |
| 5,181,214 | 1/1993 | Berger et al. | 372/34 |
| 5,191,588 | 3/1993 | Dacquay | 372/22 |
| 5,278,851 | 1/1994 | Goto | 372/19 |
| 5,287,381 | 2/1994 | Hyuga et al. | 372/75 |
| 5,289,491 | 2/1994 | Dixon | 372/92 |
| 5,343,485 | 8/1994 | Okazaki | 372/22 |
| 5,381,427 | 1/1995 | Wedekind et al. | 372/19 |
| 5,479,431 | 12/1995 | Sobottke et al. | 372/92 |

FOREIGN PATENT DOCUMENTS

| | | | |
|---|---|---|---|
| 0712184A2 | 5/1996 | European Pat. Off. | 3/109 |
| 2 252 867 | 8/1992 | United Kingdom | 3/109 |
| 2 254 483 | 10/1992 | United Kingdom | 3/109 |

OTHER PUBLICATIONS

G.J. Hall et al., Generation of single-frequency radiation at 1064, 1319, and 659.5 nm with an all-solid-state, out-of-plane Nd:YAG ring laser, Apr. 15, 1994, *Optics Letters*, vol. 19, No. 8.

N. MacKinnon et al., A laser diode array pumped, Nd:YVO4,/KTP, composite material microchip laser, Feb. 1, 1994, Optics Communications.

Kenji Suzuki et al., Low–noise diode–pumped intracavity-–doubled laser with off–axially cut Nd:YVO4, Oct. 15, 1994, Optics Letters.

*Primary Examiner*—Leon Scott, Jr.
*Attorney, Agent, or Firm*—Beyer & Weaver, LLP

[57] ABSTRACT

A single longitudinal mode frequency-converted solid-state laser includes an optical pumping source that produces optical pumping radiation, a coupled resonant cavity having a first resonant cavity and a second resonant cavity sharing a common partially reflecting mirror, a solid-state laser medium disposed within the first resonant cavity and pumped by the optical pumping radiation, and an optical wavelength converting means within said second resonant cavity. The laser medium generates a first laser radiation at a first wavelength which is converted by the wavelength converting means into a second laser radiation at a second wavelength. A temperature controlling means controls the temperatures of the first and the second resonant cavities and of the optical pumping source. The optical path lengths of the first resonant cavity and the second resonant cavity are selected such that only one longitudinal mode of the coupled resonant cavity is within the gain bandwidth of the laser medium. Thus, the single longitudinal mode can oscillate in said coupled resonant cavity. The laser has fewer intracavity elements and thus fewer internal optical losses and a higher efficiency.

40 Claims, 3 Drawing Sheets

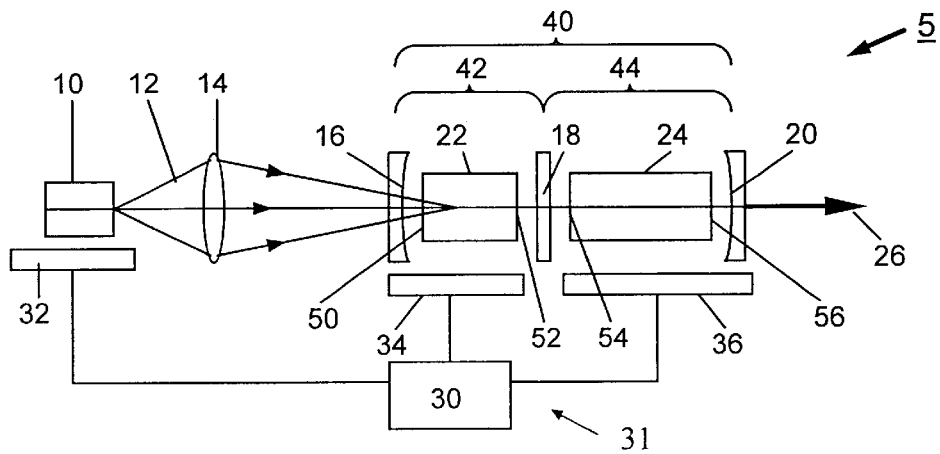
Figure 1
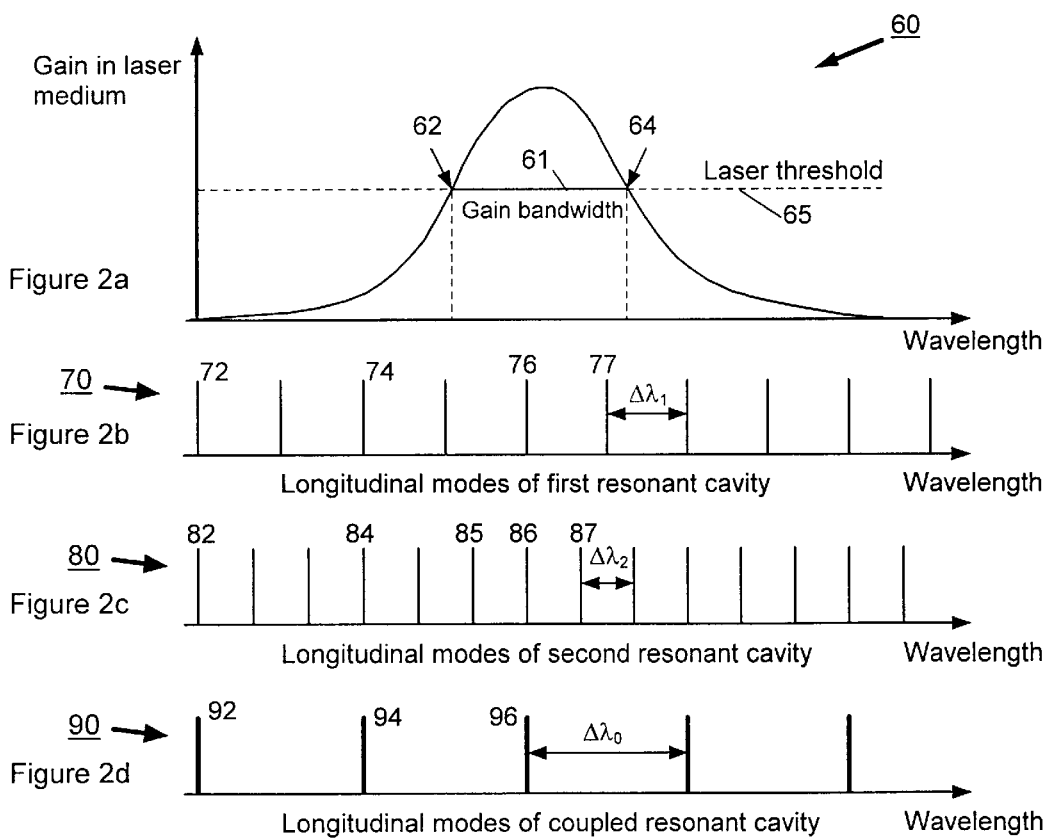
Figure 2a
Figure 2b
Figure 2c
Figure 2d

SINGLE LONGITUDINAL MODE FREQUENCY CONVERTED LASER

CROSS-REFERENCE TO RELATED APPLICATIONS

This application claims priority of provisional U.S. patent application Ser. No. 60/019,155, filed Jun. 5, 1996, entitled "Single Longitudinal Mode Frequency Converted Laser" which is incorporated by reference.

FIELD OF THE INVENTION

The present invention relates generally to lasers. More specifically, the present invention relates to a solid-state, single longitudinal mode, frequency-converted laser.

BACKGROUND OF THE INVENTION

Useful applications for single longitudinal mode, frequency-converted lasers are numerous, including holography applications, interferometry applications, optical data storage, laser imaging, coherent detection and other applications. These lasers are also essential parts in coherent optical sensors, in particle counters and in other optical measurement instruments. In particular, a diode-pumped solid-state single longitudinal mode, frequency-converted laser is a miniature, highly efficient and stable coherent light source. Such a laser may produce either short wavelength (such as blue, green or ultraviolet visible light) or long wavelength (infrared) radiation. A compact laser is desirable in many applications such as optical data storage because the optical storage device may then itself be made smaller. A smaller device such as a CD-ROM drive, a floptical disk drive or a laser memory-writing device is advantageous in today's market where small, lightweight and portable devices are popular.

Certain previous inventions are associated with free-running intracavity frequency-doubled diode-pumped solid-state lasers, typically providing chaotic output with large amplitude fluctuations. Therefore, these lasers are not suitable for some applications such as for optical data storage, interferometry and laser imaging. T. Bear et al., J. Opt. Soc. Am. B, Vol. 3, No. 9, pp. 1175–1180 (1986), and U.S. Pat. No 4,701,929 disclose chaotic output with large amplitude noise in the diode-pumped Nd:YAG intracavity frequency-doubled laser system. They indicate that the causes of the instability arise from the nonlinear coupling of axial modes via sum-frequency generation and cross-saturation effects in the laser cavity. They also report that when the laser operates in a single longitudinal mode with an additional etalon that the large amplitude noise on the green output laser beam disappears and that the output power is stable; however, the output is quite low.

Thus, even though noise is reduced and the power is more stable in this laser, the output is still low. Also, these references disclose the use of an additional etalon. An etalon is typically a filter inside the cavity of a laser that is used to tune the laser by selecting a wavelength or frequency. An etalon may be used to reduce the gain bandwidth of the laser, thus limiting the number of oscillating axial modes, which helps achieve a single longitudinal mode. However, the introduction of an etalon (or other mechanism) into the cavity of the laser causes internal optical losses and reduces laser efficiency. Also, an etalon in the cavity means a more complex design that is more difficult and costly to manufacture. For example, etalons may use two partially reflecting mirrors inside the laser cavity that lead to greater losses. Also, mounting an etalon in the laser cavity can be a complex task. In addition, other techniques for achieving single longitudinal mode operation such as using a beam polarizer may also lead to internal optical losses.

The amplitude noise of the output radiation of a frequency-doubled laser can be substantially eliminated if the laser operates in a single longitudinal mode. Therefore, the resonant cavity of the laser must meet certain criteria in order to achieve a single longitudinal mode.

Diode-pumped solid-state lasers that provide single longitudinal mode frequency-converted output have been described in recent developments. One example of such a solid-state laser is described in U.S. Pat. No. 5,052,815, "Single Frequency Ring Laser with Two Reflecting Surfaces", issued on Oct. 1, 1991 to Nightingale et al. The ring laser disclosed in this patent is pumped by a diode laser and can generate stable single frequency second harmonic laser output, but the optical alignment of the ring laser cavity is critical, i.e., the ring laser suffers from complicated fabrication and alignment procedures. This laser requires sophisticated optical elements in the laser cavity. In other words, although the ring laser of Nightingale et al. achieves a single longitudinal mode, it does so at the expense of a more complex laser cavity that is more difficult and costly to build.

Other inventors have also attempted to build single longitudinal mode, frequency-doubled lasers. U.S. Pat. No. 5,164,947, "Single Frequency, Frequency-doubled Laser", issued on Nov. 17, 1992 to Luckas et al. discloses a laser that can produce single longitudinal mode and frequency-doubled laser light. This light is achieved by substantially eliminating spatial hole burning in the lasant material and by combining a Lyot filter with second harmonic generating principles. However, the design of this invention suffers from intracavity losses originating from the waveplates and the polarizer of the Lyot filter that are required in the laser resonant cavity. Thus, the laser of Luckas et al. also achieves a single longitudinal mode, but at the expense of extra components in the laser cavity, namely the waveplates and the polarizer. These extra components produce internal optical losses and complicate the laser cavity.

More recently, U.S. Pat. No. 5,381,427, "Single Mode Laser", issued on Jan. 10, 1995, to Wedekind et al., discloses a diode-pumped laser for single mode operation in which a polarizer with a birefringent crystal is located in the laser resonant cavity. Again, the polarizer and waveplate optical elements located within the laser resonant cavity cause internal optical losses and consequently reduce the efficiency of the laser output.

Therefore, a laser capable of a single longitudinal mode of operation with fewer intracavity elements would be desirable. Such a laser would have excellent output stability, low noise, high efficiency and a simplified design, and would be simpler and cheaper to manufacture.

SUMMARY OF THE INVENTION

To achieve the foregoing, and in accordance with the purpose of the present invention, a frequency-converted laser is disclosed that produces single longitudinal mode wavelength-converted laser light and has fewer optical elements within the laser resonant cavity.

The laser uses no etalon, Lyot filter, wave plates, etc., and has only one common partially reflecting mirror in the laser cavity. Thus, the laser has fewer internal optical losses, no complex alignment is needed, and it is simpler and less expensive to manufacture while its power output is sufficient. The laser also maintains its operating characteristics over time as there are no additional intra-cavity elements to be maintained. Due to its simplicity, the laser is extremely compact. For example, it can be as small as approximately 5 cm×2 cm×2 cm. In various of the embodiments, the mirrors used may be directly coated onto a material, producing a compact design. Additionally, the solid-state coupled resonant cavity produces a very rigid, reliable laser.

The laser is suitable for producing blue or green light, as well as others. Blue and green lasers are especially useful in imaging applications, and in storage technology where the shorter wavelengths are used for higher density storage. The short wavelengths of blue and green lasers are also more efficient in light scattering applications with particulate matter, such as in environmental studies. The laser is also useful in laser printers due to its compact size.

In one embodiment of the present invention, a diode-pumped solid-state laser has an Nd doped laser crystal and a frequency-doubled crystal, and produces stable output of second harmonic radiation in the visible wavelength region.

In another embodiment of the present invention, a diode-pumped, single longitudinal mode, frequency-doubled, solid-state laser with a coupled resonant cavity produces stable laser radiation with less than 1% root mean square noise.

In another embodiment of the present invention, a diode-pumped single longitudinal mode, frequency-converted laser with a coupled resonant cavity has a common partially reflecting mirror shared by first and the second laser resonant cavities.

In accordance with one aspect of present invention, a single longitudinal mode laser includes an optical pumping source that produces optical pumping radiation, and first and second resonant cavities that share a partially reflecting mirror. A solid-state laser medium is disposed within the first resonant cavity and is positioned to receive the optical pumping radiation from the optical pumping source. The laser medium generates a first laser radiation at a first wavelength in single transverse mode. An optical wavelength converting means disposed within the second resonant cavity converts the first laser radiation at the first wavelength into a second laser radiation at a second wavelength. A temperature controlling means controls the temperature of the first resonant cavity and the temperature of the second resonant cavity. The first resonant cavity and the second resonant cavity are used for oscillating the first laser radiation. The volume of the optical pumping radiation in the solid-state laser medium is substantially adapted to the volume of the basic transverse mode of the coupled resonant cavity in accordance with the first wavelength to limit the transverse modes of the first laser radiation to be a single basic transverse mode (TEMoo).

The optical wavelength converting means is able to double, triple, quadruple, etc. the frequency of light output from the laser medium, thus producing shorter wavelength light. For example, relatively long wavelengths (such as in the infrared range) emitted from the laser medium are converted to shorter wavelengths in the blue or green range and output from the laser. Or, the frequency may be quadrupled if ultraviolet laser light output is desired, or further multiplied for even shorter wavelengths. Moreover, the optical wavelength converting means may also reduce the frequency in order to produce longer wavelengths if desired.

Another aspect of the present invention is the selection of the optical path lengths of the first and the second resonant cavities in the coupled resonant cavity of the laser. The optical path lengths of the first and second resonant cavities are selected such that only one longitudinal mode of the coupled resonant cavity is within the gain bandwidth and above the laser threshold; the single longitudinal mode oscillates in the coupled resonant cavity. The optical path length is the product of the refractive index and the geometrical length. Preferably, the lengths of the first resonant cavity and the second resonant cavity are selected such that the interval of longitudinal modes of the coupled resonant cavity is larger than one-half of the gain width of the solid-state laser medium at the laser oscillating wavelength.

Still another aspect of present invention relates to the common partially reflecting mirror having a reflectance between 3% and 98% at the first wavelength in the laser described above. Preferably, the common partially reflecting mirror has a reflectance between 15% and 80% at the first wavelength. More preferably, the common partially reflecting mirror has a reflectance between 25% and 70% at the first wavelength. Preferably, the mirror is formed on the intermediate surface of the optical wavelength converting means, or is formed on the intermediate surface of the solid-state laser medium. The intermediate surface of the solid-state laser medium is near the intermediate surface of the optical wavelength converting means. The common partially reflecting mirror may also include absorption layers.

In accordance with still another aspect of the present invention, a frequency-converted coupled resonant cavity includes a first resonant cavity, and a second resonant cavity. The first cavity has a first optical path length and includes a solid-state laser medium for generating a first laser radiation at a first wavelength. The second cavity has a second optical path length and includes an optical wavelength converting means for converting the first laser radiation at the first wavelength into a second laser radiation at a second wavelength. A temperature controller may be used to help select the optical path lengths of each of the cavities. Also, the first resonant cavity shares a partially reflecting mirror with the second resonant cavity. Moreover, the common partially reflecting mirror partially reflects laser radiation at the first wavelength and partially transmits laser radiation at the first wavelength. Preferably, the ratio of the second optical path length to the first optical path length is substantially equal to either 0.5 or 1.5. In addition, the ratio of the first optical path length to the second optical path length may also be substantially equal to either 0.5 or 1.5. For a ratio of 1.5, for example, the ratio need not be exactly 1.5 but merely about 1.5. That is, a ratio of 1.4 or 1.6 may also work well.

Furthermore, the laser may be used in a multiple mode operation by varying the optical path lengths. Thus, a single laser can be used for both single mode and multiple mode operation.

BRIEF DESCRIPTION OF THE DRAWINGS

The invention, together with further advantages thereof, may best be understood by reference to the following description taken in conjunction with the accompanying drawings in which:

FIG. 1 is a schematic diagram of a single longitudinal mode frequency-converted solid-state laser according to a first embodiment of the present invention.

FIG. 2A is a plot illustrating an exemplary relationship of the gain curve of a laser medium versus its emitted wavelength, the laser threshold and the corresponding gain bandwidth.

FIG. 2B illustrates an example of the wavelength positions of the longitudinal modes of the first resonant cavity according to an embodiment of the present invention.

FIG. 2C illustrates an example of the wavelength positions of the longitudinal modes of the second resonant cavity according to an embodiment of the present invention.

FIG. 2D illustrates an example of the wavelength positions of the longitudinal modes of the coupled resonant cavities according to an embodiment of the present invention.

DETAILED DESCRIPTION OF THE INVENTION

Figure 3:
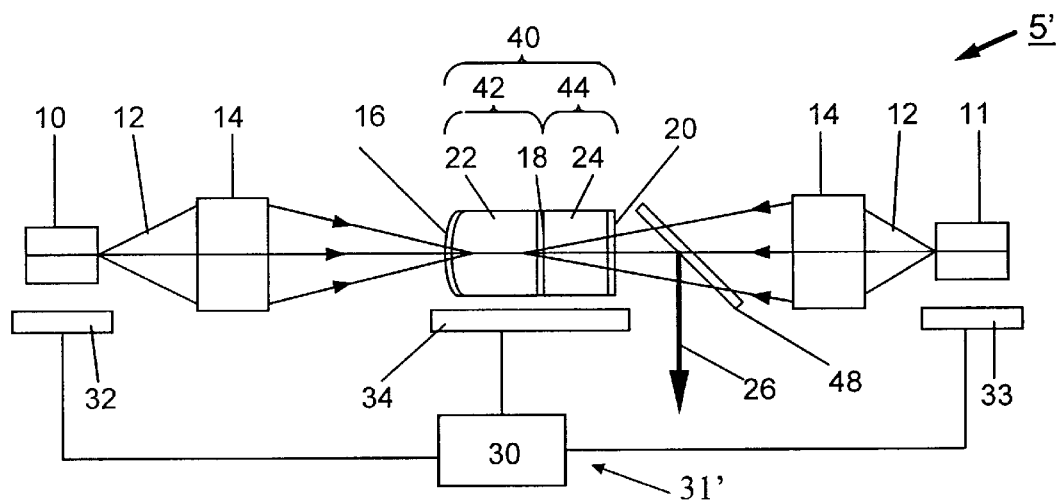
FIG. 3 is a schematic diagram of a single longitudinal mode frequency-converted solid-state laser having two pumping sources and an angled output according to a second embodiment of the present invention.

The present invention provides a laser with stable single longitudinal mode operation, and is designed as a frequency-converted laser with fewer intracavity optical elements, thus leading to excellent output stability, high efficiency, economic manufacturing and simplified alignment procedures.

While the present invention is susceptible of embodiments in many forms, four exemplary embodiments are schematically shown in FIGS. 1, 3, 4 and 5. The disclosure herein is to be considered as illustrative of the principles of the invention and is not intended to limit the invention to the exemplary embodiments illustrated in the drawings and in the detailed description below.

One embodiment of the present invention is shown in FIG. 1 in which a single longitudinal mode, frequency-converted solid-state laser 5 is disclosed. This embodiment includes an optical pumping source 10 for producing optical pumping radiation 12, coupling optics 14, an input mirror 16, a common partially reflecting mirror 18, an output mirror 20, a solid-state laser medium 22, an optical wavelength converting means 24, temperature controlling means 31 including a control circuit 30, thermal active elements 32, 34 and 36 and temperature sensors (not shown). Active elements 32 may take a wide variety of forms. By way of example, a heater, a thermoelectric device, or a Peltier element may be used as a thermal active element. The temperature sensors may be thermistors, thermocouples, or semiconductor thermal sensors, etc.

A coupled resonant cavity 40 includes a first resonant cavity 42 and a second resonant cavity 44. Input mirror 16 and partially reflecting mirror 18 define first resonant cavity 42, and output mirror 16 and partially reflecting mirror 18 define second resonant cavity 44. Partially reflecting mirror 18 is shared by the first and second resonant cavities. Solid-state laser medium 22 is disposed within first resonant cavity 42 and is positioned to receive optical pumping radiation 12. Medium 22 generates a first laser radiation at a first wavelength in single transverse mode (TEMoo). The present invention is also applicable where a mode other than a single transverse mode is used, although the single transverse mode is preferred. Optical wavelength converting means 24 is disposed within second resonant cavity 44 for converting the first laser radiation at the first wavelength into a second laser radiation at a second wavelength. A portion of the second laser radiation passes through output mirror 20 as output radiation 26. The first and second resonant cavities are arranged to oscillate the first laser radiation at the first wavelength.

Optical pumping source 10 may be any source of optical radiation. A wide variety of pumping sources may be used. By way of example, optical pumping source 10 may be a laser diode, a laser diode array, light-emitting diodes, a group of laser diodes or a group of laser diode arrays. Such diode lasers may be attached to thermally conductive heat sinks and the temperatures of the heat sinks may be controlled to thereby ensure optimal operation of the optical pumping source. Active element 32 is shown adjacent to source 10 which is advantageous for diode lasers because of the heat generated, although for other pumping sources a heating or cooling element may not be required.

Coupling optics 14 serve to focus optical pumping radiation 12 from source 10 into solid-state laser medium 22 within a pumping volume. Coupling optics 14 may include any optics and mirrors for transmitting light, such as a lens, a gradient index lens, a fiber optics device, an aspheric lens, a focusing mirror, or a combination of optics selected from lenses, gradient index lenses, prisms, optical fibers, and mirrors. The pumping volume in the laser medium is substantially adapted to the volume of the basic transverse mode in the coupled resonant cavity in order to support the first laser radiation to be a single basic transverse mode. A variety of methods may be used to adapt the pumping volume. By way of example, adjustment of the lenses of the coupling optics may be performed to support a single transverse mode.

Control circuit 30 may be implemented in a wide variety of ways. By way of example, control circuit 30 may be implemented using digital or analog circuitry in order to provide a particular temperature to elements 32, 34 and 36 as will be appreciated by those of skill in the art. A digital circuit is more stable, although an analog circuit may be simpler to implement.

Laser medium 22 emits the first laser radiation at the first wavelength in response to pumping radiation 12. A wide variety of laser media may be used. By way of example, suitable laser media include solids which include at least a laser active element, such as Nd, Er, Ti, Cr, and other rare earth elements. Preferably, the solid-state laser medium 22 is made from a material which is selected from the group of Nd:YAG, Nd:YAP, Nd:YVO$_4$, Nd:GdVO$_4$, Nd:Sr$_5$(PO$_4$)$_3$F, Nd:LaSc$_3$(BO$_3$)$_4$, NAB, NdP$_5$O$_{14}$, NdLiPO, NdKPO, Nd:YLF, Nd:Sr$_5$(VO$_4$)$_3$F, Nd:YAB and Nd:X$_a$Z$_b$(BO$_3$)$_{(a+b)}$, where "X" is one element selected from Al, Y, Sc and the rare earth elements, and where "Z" is one element selected from Al, Y, Sc and the rare earth elements. The subscripts "a" and "b" each represent an integer or a fractional number. The laser medium may be a solid or may be a combination of solids. The cross-sectional shape of laser medium 22 and wavelength converting means 24 may be any suitable shape, and the shape of medium 22 may be different from that of means 24.

Optical wavelength converting means 24 is for converting the first laser radiation at the first wavelength generated by laser medium 22 into a second laser radiation at a second wavelength which is different from the first wavelength. It is known that the conversion of optical radiation from one wavelength to optical radiation of another wavelength through nonlinear optical interaction may be implemented by a non-linear optical material using non-linear optical conversion techniques. Although a doubling of the frequency is preferred, the frequency may be increased by any suitable amount. By way of example, the frequency may be quadrupled if wavelengths in the ultraviolet range are desired. Examples of such conversion techniques include harmonic generation, optical mixing, parametric oscillation, frequency up-conversion and frequency down-conversion. Suitable optical wavelength converting means may include a wide variety of non-linear optical materials. By way of example, preferably the non-linear optical materials include KTP, YAB, BBO, KNbO$_3$, LiNbO$_3$, LBO, CLBO, LIO, KDP, ADA, ADP, CDA, and MTiO(XO$_4$), where "M" is at least one of K, Rb, Tl, Cs or NH$_4$, and where "X" is at least one of P or As. The wavelength converting means may be a non-linear optical material or may be a combination of non-linear optical materials.

Input mirror 16 is for transmitting optical pumping radiation 12 and for substantially reflecting the laser radiation at the first wavelength generated by laser medium 22. Preferably, mirror 16 has a reflectance between 99% and 100% at the first wavelength and is highly transparent (preferably, transmittance T>60%) at the wavelength of optical pumping radiation 12. Input mirror 16 may be arranged in any suitable manner as will be appreciated by those of skill in the art. By way of example, input mirror 16 may be formed on the input surface 50 of solid-state laser medium 22. Preferably, input mirror 16 further substantially reflects the second radiation converted by optical wavelength converting means 24 at the second wavelength.

Output mirror 20 is for substantially reflecting laser radiation at the first wavelength and for partially transmitting the second radiation converted by optical wavelength converting means 24 at the second wavelength. Preferably, it has a reflectance between 99% and 100% at the first wavelength. Preferably, output mirror 20 is formed on the output surface 56 of optical wavelength converting means 24.

Common partially reflecting mirror 18 is shared by first resonant cavity 42 and second resonant cavity 44 and is for partially reflecting the laser radiation at the first wavelength generated by laser medium 22 and for partially transmitting the laser radiation at said first wavelength. A wide variety of implementations of mirror 18 are possible. By way of example, as shown in FIG. 1, mirror 18 may be a separate mirror separated from medium 22 and converting means 24. Alternatively, mirror 18 may be formed on a surface of medium 22 or of means 24, and the medium 22 and means 24 may be adjacent or may be separated by space.

It may have a reflectance between 3% and 98% at the first wavelength. Preferably, common partially reflecting mirror 18 has a reflectance between 15% and 80% at the first wavelength. More preferably, mirror 18 has a reflectance between 25% and 70% at the first wavelength. Preferably, mirror 18 further reflects pumping radiation 12. Mirror 18 is preferably formed on intermediate surface 52 of laser medium 22. As an alternative, it may also be formed on intermediate surface 54 of optical wavelength converting means 24 when intermediate surface 52 is adjacent to intermediate surface 54. Common partially reflecting mirror 18 may be formed from optical thin film coatings which include dielectric layers, metal layers and absorption layers. An absorption layer is useful for reducing gain bandwidth and for reducing the oscillating longitudinal modes in the coupled resonant cavities, but may result in a lower output. Optical wavelength converting means 24 in second resonant cavity 44 generates the second radiation in two directions, i.e., in the same direction of, and opposite to, the direction with respect to the laser output direction. Thus, common partially reflecting mirror 18 preferably further reflects the second radiation at the second wavelength. Thus, it may reduce the second radiation in the direction opposite to the laser output direction and increase the laser output.

FIG. 2A is a plot 60 illustrating an exemplary relationship of the gain curve of a laser medium versus its emitted wavelength. FIGS. 2B, 2C and 2D are illustrative plots according to an embodiment of the present invention and show respectively the wavelength positions 70 of the longitudinal modes of the first resonant cavity 42, the wavelength positions 80 of the longitudinal modes of the second resonant cavity 44, and the wavelength positions 90 of the longitudinal modes of the coupled resonant cavity 40,. Other modes are possible.

Plot 60 of FIG. 2A has for a vertical axis the gain of the laser medium, and for a horizontal axis the emitted wavelength. Gain bandwidth 61 is the difference between points 62 and 64 on the gain curve at laser threshold 65.

FIGS. 2A through 2D are aligned vertically to better illustrate that various of the wavelength positions of the longitudinal modes may fall within the gain bandwidth. For example, FIG. 2B illustrates how wavelength positions 76 and 77 of longitudinal modes for the first resonant cavity fall within the gain bandwidth 61 for the laser medium. FIG. 2C illustrates how wavelength positions 85, 86 and 87 of longitudinal modes for the second resonant cavity also fall within gain bandwidth 61. Thus, multiple longitudinal modes might be present for these cavities separately. Advantageously, though, FIG. 2D illustrates how through use of an embodiment of the present invention, only wavelength position 96 for the coupled resonant cavity falls within gain bandwidth 61. Thus, the use of the coupled resonant cavity in an embodiment of the invention results in a single longitudinal mode laser that is desirable for the reasons described above. How a coupled resonant cavity may be used in this fashion will now be described.

As mentioned above, gain bandwidth 61 of the laser medium is the separation between points 62 and 64 as indicated in FIG. 2A where the gain is equal to or greater than the loss. Within the gain bandwidth the gain is above the laser threshold and the laser may oscillate. Outside the gain bandwidth the gain is below threshold, and thus the laser does not operate properly. The gain bandwidth is related to the round trip loss in the cavity, the inversion density related to the pumping radiation, and the fluorescent line width and fluorescent lifetime of the laser medium at the laser transition wavelength. The interval of the longitudinal modes of first cavity 42 is $\Delta\lambda_1 = \lambda^2/2n_1 d_1$, where $\lambda$ is the first wavelength emitted by the laser medium, $n_1 d_1$ is the optical path length of the first resonant cavity, with $n_1$ being the refractive index of the first resonant cavity and $d_1$ being the geometrical length of the first resonant cavity. The interval of the longitudinal modes of the second cavity 44 is $\Delta\lambda_2 = \lambda^2/2n_{2D2}$, where $\lambda$ is the first wavelength, $n_{2D2}$ is the optical path length of the second resonant cavity, with $n_2$ being the refractive index of the second resonant cavity and $d_2$ being the geometrical length of the second resonant cavity. If the cavity includes several optical media, the optical path length of the cavity is the sum of the optical path lengths of each optical medium within the cavity.

The interval $\Delta\lambda_0$ of the longitudinal modes of the coupled cavity 40 is the lowest common multiple of $\Delta\lambda_1$ and $\Delta\lambda_2$. For example, as shown in FIGS. 2B, 2C and 2D, the ratio of the optical path length of second resonant cavity 44 to the optical path length of first resonant cavity 42 is 1.5, i.e., the interval $\Delta\lambda_0$ of the longitudinal modes of the coupled cavity is equivalent to $2\Delta\lambda_1$ and is also equivalent to $3\Delta\lambda_2$. The wavelength positions of the longitudinal modes of the first, the second, and the coupled resonant cavities may be tuned and controlled by suitably controlling the temperatures of the first and second resonant cavities. In other words, the temperature of the first and second cavities affects the values n and d (refractive index and geometrical length of a cavity), which in turn affects the optical path length of a cavity. Moreover, the wavelength positions may also be tuned by application of pressure on the relevant parts of the coupled resonant cavity.

The optical path lengths of first resonant cavity 42 and second resonant cavity 44 are selected such that only one longitudinal mode of coupled resonant cavity 40 is within the gain bandwidth above the threshold, and the single longitudinal mode oscillates in the coupled resonant cavity. Preferably, the optical path lengths of first resonant cavity 42 and second resonant cavity 44 are selected such that the interval of the longitudinal modes of coupled resonant cavity 40 is larger than one half of the gain bandwidth of the laser medium. More preferably, the ratio of the optical path length of second resonant cavity 44 to the optical path length of first resonant cavity 42 (or the ratio of the optical path length of first resonant cavity 42 to the optical path length of second resonant cavity 44) is substantially equal to a value which is selected from the group of 0.5, 1.5, 2.5, 3.5, 4.5, 5.5, 6.5 7.5, and 8.5. Most preferably, the ratio of the optical path length of second resonant cavity 44 to that of first resonant cavity 42 (or the ratio of the first to the second) is substantially equal to a value from the group of 0.5, 1.5, and 2.5.

Temperature controlling means 31 is employed to adjust and control the temperature of first resonant cavity 42 and its components, and to adjust and control the temperature of second resonant cavity 44 and its components. Thus, the optical path lengths of the first and second resonant cavities may be adjusted by temperature controlling means 31 to maintain a single longitudinal mode of the coupled resonant cavity above the laser threshold and to keep the single longitudinal mode oscillating within the gain width. The temperature controlling means may substantially maintain optical wavelength converting means 24 in a predetermined temperature for phase matching, and may maintain the optical path lengths of the first and second cavities to be predetermined constants. In this way the stability of the output of the laser is improved. Preferably, temperature controlling means 31 further controls the temperature of pumping source 10 by way of element 32.

Figure 4:
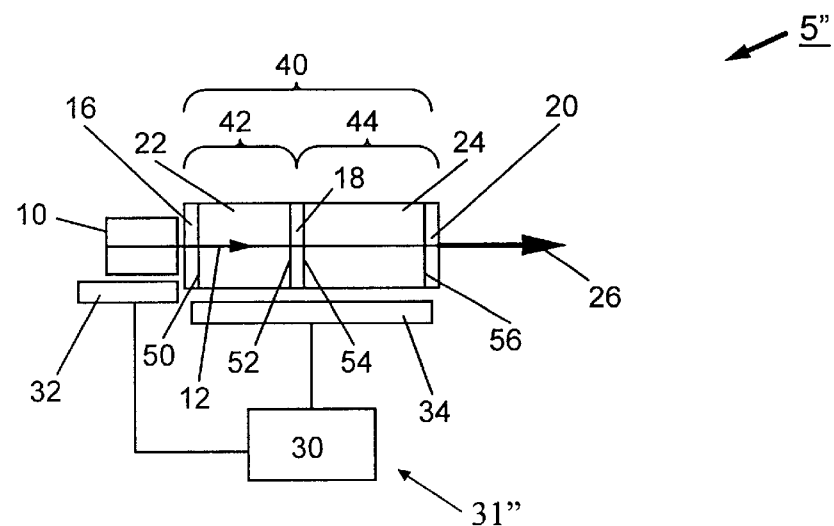
FIG. 4 is a schematic diagram of a single longitudinal mode frequency-doubled solid-state laser suitable for producing green light according to a third embodiment of the present invention.
Figure 5:
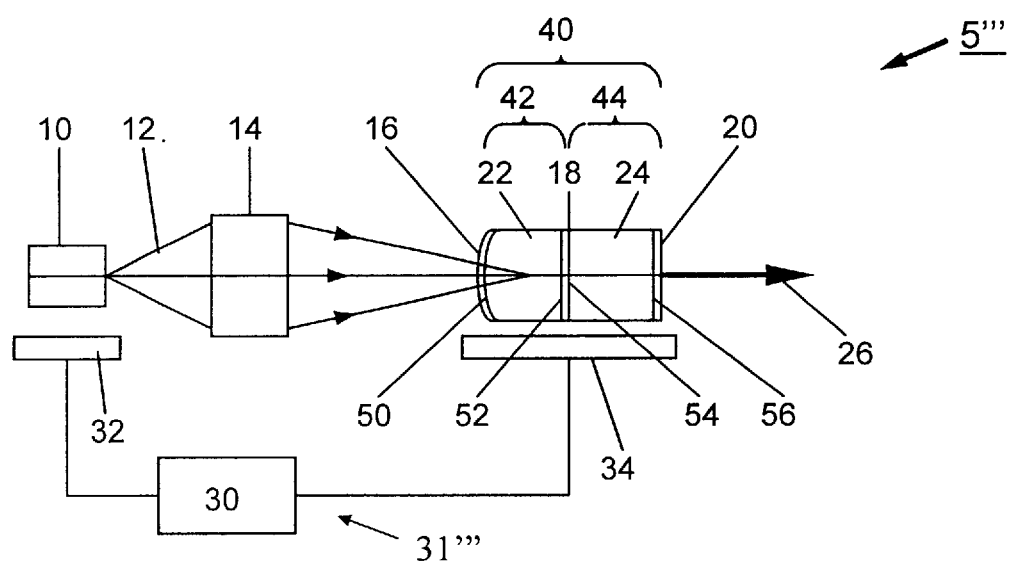
FIG. 5 is a schematic diagram of a single longitudinal mode frequency-doubled solid-state laser suitable for producing blue light according to a fourth embodiment of the present invention.

FIGS. 3, 4 and 5 each present alternative embodiments of the present invention and include elements as described above in FIG. 1. Differences between these alternative embodiments and the embodiment of FIG. 1 will now be discussed below.

In one alternative embodiment of the present invention, a laser 5' has a laser medium 22 that is pumped on both end sides as shown in FIG. 3. As can be seen, two separate pumping sources 10 and 11 are used at each end of coupled resonant cavity 40 for increasing the power output of the laser. A dichromatic mirror 48 is located near output mirror 20 outside coupled cavity 40 for transmitting optical pumping radiation 12 and for substantially reflecting laser radiation at the second wavelength transmitted from output mirror 20 as output radiation 26. Temperature controlling means 31' includes control circuit 30, Peltier elements 32, 33 and 34, and is employed to control the temperature of coupled resonant cavity 40 and pumping sources 10 and 11. Input mirror 16 and common partially reflecting mirror 18 are directly coated on the surfaces of laser medium 22, and output mirror 20 is directly coated on the output surface of wavelength converting means 24.

In another embodiment of the present invention, a laser 5" is shown in FIG. 4 that has a diode pumping source 10 placed adjacent to laser medium 22. The pumping source 10 and laser medium 22 are sufficiently close so that a divergent beam of optical pumping radiation emanating from the diode pumping source will pump a small volume in the laser medium 22 to support only a single transverse mode, i.e., TEMoo mode operation. In this example, coupling optics are not required. Input mirror 16 is coated directly on input surface 50 of laser medium 22. Output mirror 20 and common partially reflecting mirror 18 are directly coated on the surfaces of second harmonic generator 24. Temperature controlling means 31" includes control circuit 30, Peltier elements 32 and 34, and is employed to control the temperature of coupled resonant cavity 40 and pumping source 10.

In the example of the embodiment illustrated in FIG. 4, an AlGaAs diode laser is used as a pumping source 10 which can emit 500 mW optical pumping radiation 12 at the wavelength of about 810 nm. In this case, an Nd:YVO$_4$ crystal is used as laser medium 22, and generates laser radiation with a first wavelength of approximately 1064 nm. KTP crystal is used as a second harmonic generator 24, placed adjacent to the laser medium 22, and is used for generating the second harmonic radiation (532 nm) of the laser radiation with the first wavelength (1064 nm). Although a variety of thicknesses for the crystals are suitable for use with the present invention, a thickness of 1.25 mm for the KTP crystal works well, and the Nd:YVO$_4$ crystal has a thickness of 0.68 mm the embodiment described for FIG. 4. A thickness of 0.4 mm for the Nd:YVO$_4$ crystal also works well.

Coupled resonant cavity 40 has a first resonant cavity 42 and a second resonant cavity 44. The first resonant cavity 42 is defined by input mirror 16 and common partially reflecting mirror 18 which is shared with second resonant cavity 44. Second resonant cavity 44 is defined by output mirror 20 and common partially reflecting mirror 18. The ratio of the optical path length of second resonant cavity 44 to the optical path length of first resonant cavity 42 is substantially equal to a value which is selected from the group of 0.5, 1.5, 2.5 and 3.5. Preferably, the optical path length of first resonant cavity 42 is selected to be 1.5 mm, and the optical path length of second resonant cavity 44 is selected to be 2.25 mm, which gives a preferred ration of 1.5.

Input mirror 16, which is highly reflective (R>99.9%) at the wavelength of 1064 nm and highly transparent (T>95%) at the optical pumping radiation wavelength of 810 nm, is formed on the input surface 50 of the Nd:YVO$_4$ crystal. Output mirror 20, which is highly reflective (reflectance R>99.9%) at the wavelength of 1064 nm and highly transparent (T>95%) at the wavelength of 532 nm, is formed on output surface 56 of the KTP crystal. Common partially reflecting mirror 18 has a reflectance of approximately 30% at the wavelength of 1064 nm and a high reflectance at the wavelength of 532 nm is formed on intermediate surface 54 of the KTP crystal. As an alternative, mirror 18 may be on intermediate surface 52 of the Nd:YVO$_4$ crystal.

In this embodiment, Peltier elements 32 and 34 are thermoelectric coolers, and are used in conjunction with thermistors to control the temperature of the diode laser and the coupled resonant cavity and its components. Typically, the temperature of the coupled resonant cavity may range from about 0° C. to about 60° C. depending upon the arrangement of the laser, and in this embodiment a constant temperature of the coupled resonant cavity within about 0.1° C. works well.

As a result, the laser emits green visible light radiation at a wavelength of 532 nm with more than 20 mW single longitudinal mode and single transverse mode output. This laser output is stable within 1% root mean square noise. Also, because all mirrors in the coupled resonant cavity are coated on the surfaces of the solid-state laser medium and on the second harmonic generator, the number of optical elements in the coupled resonant cavity is reduced, and thus optical losses in the cavity are reduced. In addition, this method improves the second harmonic radiation output and the fabrication process is simplified.

In this embodiment, input surface 50 is a flat surface and input mirror 16 is a substantially flat mirror which is easier to manufacture than a curved mirror and works well with a larger pumping source. Typically, frequency doubling may be achieved with such a green light laser without the need for a curved input mirror, although a curved input mirror may also be used in this embodiment.

FIG. 5 shows still another embodiment of a single longitudinal mode frequency-doubled blue laser 5''' in accordance with the present invention. In this case a diode pumping source 10 emits optical pumping radiation 12 at a wavelength of about 808 nm. Coupling optics 14 focuses the pumping radiation onto laser medium 22 (in this embodiment a Nd:YAG crystal) within a sufficiently small pumping volume to generate laser radiation at a wavelength of 947 nm in a single transverse mode i.e., TEMoo mode.

Because the Nd:YAG crystal also produces wavelengths of 1064 nm and 1320 nm in addition to a wavelength of 947 nm, the additional wavelengths of 1064 nm and 1320 nm are suppressed for best operation. In this embodiment, mirror 18 has a high enough transmission at these two wavelengths (at least 50%) in order to help suppress them.

Input mirror 16 is highly reflective (R>99.9%) at the wavelength of 947 nm (generated by the laser medium) and transparent at the wavelengths of 808 nm, 1064 nm and 1320 nm. Input mirror 16 is coated directly on input surface 50 of the Nd:YAG crystal. Common partially reflecting mirror 18 is coated on intermediate surface 52 of the Nd:YAG crystal, and mirror 18 has a partial reflectance (around 50%) at the wavelength of 947 nm. Preferably, mirror 18 has additional high reflectance at the wavelength of 808 nm and high transmission at the wavelengths of 1064 nm and 1320 nm. More preferably, mirror 18 further has additional high reflectance at the wavelength of 473 nm. Output mirror 20 is coated on output surface 56 of second harmonic generator 24 (in this embodiment a $KNbO_3$ crystal) that produces the 473 nm radiation from the 947 nm radiation. Output mirror 20 is highly reflective at the wavelength of 947 nm and is transparent at the wavelengths of 473 nm, 1064 nm and 1320 nm.

The thickness of the Nd:YAG and $KNbO_3$ crystals are approximately 0.8 mm and 1 mm, respectively. The refractive index of the Nd:YAG crystal is 1.83 and the refractive index of the $KNbO_3$ crystal is 2.23. Thus, the optical path length of the first cavity is 1.83× 0.8 mm=1.484 mm and the optical path length of the second cavity is 2.23 mm, which gives the preferred ratio of the optical path length of second resonant cavity 44 to the optical path length of first resonant cavity 42 to be about 1.5.

Temperature controlling means 31''' includes control circuit 30, Peltier elements 32 and 34 and thermistors, and is employed to control the temperature of the coupled resonant cavity and for controlling the temperature of the diode pumping source. As a result, the laser emits blue light radiation of more than 3 mW at a wavelength of 473 nm in single longitudinal mode as well as in single transverse mode.

This embodiment uses a curved input surface 50 on medium 22 meaning that input mirror 16 is also curved. Although a substantially flat input mirror may also be used, for this blue laser frequency doubling is more easily achieved and efficiency is higher with a curved input mirror.

The present invention is applicable for use with a wide variety of crystals and materials, and may operate at a wide variety of temperatures. For example, a laser with a KTP crystal may operate in a range of from about 0° C. to 200° C., with a range of 0° C. to 60° C. working well, and operation at room temperature being most convenient. An LBO crystal works well at 185° C.

While the above description contains many specifics, these should not be construed as limitations on the invention, but rather as examples of preferred embodiments. Various modifications may be made within the scope and spirit of the claimed invention. For example, any suitable pumping source or coupling optics may be used. Also, although specific embodiments for green and blue lasers are illustrated, the present invention may be used to produce laser radiation at other wavelengths. The wavelength converting means may also produce other higher or lower frequencies in addition to doubling the frequency. The temperature controller and its elements may take any suitable form for generating a desired temperature for a particular cavity or cavities. Also, cavities may be adjacent or separated, and mirrors may be coated onto a material or be separate. The laser can be used for both single mode and multiple mode. Therefore, the present invention is intended to cover all such modifications as indicated by the scope of the appended claims and their legal equivalents.

We claim:

1. A single longitudinal mode, frequency-converted solid-state laser comprising:

an optical pumping means for producing optical pumping radiation;

a coupled resonant cavity including a first resonant cavity and a second resonant cavity that share a common partially reflecting mirror;

a solid-state laser medium disposed within said first resonant cavity and being optically pumped by said optical pumping radiation, said solid-state laser medium generating a first laser radiation at a first wavelength;

an optical wavelength converting means disposed within said second resonant cavity for converting said first laser radiation at said first wavelength into a second laser radiation at a second wavelength; and a temperature controlling means for controlling the temperature of said first resonant cavity and said second resonant cavity, whereby said first resonant cavity and said second resonant cavity are used for oscillating said first laser radiation at said first wavelength.

2. The laser of claim 1 wherein optical path lengths of said first resonant cavity and of said second resonant cavity are selected such that only one longitudinal mode of said coupled resonant cavity is within the gain bandwidth of said laser medium.

3. The laser of claim 1 wherein the ratio of an optical path length of said second resonant cavity to an optical path length of said first resonant cavity is about a value selected from the group of 0.5, 1.5, 2.5, 3.5, 4.5, 5.5, 6.5, 7.5, and 8.5.

4. The laser of claim 1 wherein the ratio of an optical path length of said first resonant cavity to an optical path length of said second resonant cavity is about a value selected from the group of 0.5, 1.5, 2.5, 3.5, 4.5, 5.5, 6.5, 7.5, and 8.5.

5. The laser of claim 1 wherein optical path lengths of said first resonant cavity and of said second resonant cavity are selected such that the interval of longitudinal modes of said coupled resonant cavity is larger than one half of the gain bandwidth of said solid-state laser medium.

6. The laser of claim 5 wherein the ratio of said optical path length of said second resonant cavity to said optical path length of said first resonant cavity is about a value selected from the group of 0.5, 1.5 and 2.5.

7. The laser of claim 1 wherein said solid-state laser medium is a solid that includes at least one element selected from the group of Nd, Ho, Er, Tm, Ti, Cr, Yb, Ce, and rare earth elements.

8. The laser of claim 1 wherein said solid-state laser medium is made from a material that is selected from the group of Nd:YAG, Nd doped garnets, Nd:glass, Nd:YAP, Nd:YVO$_4$, Nd:GdVO$_4$, Nd:Sr$_5$(PO$_4$)$_3$F, Nd:LaSc$_3$(BO$_3$)$_4$, NAB, NdP$_5$O$_{14}$, NdLiPO, NdKPO, Nd:YLF, Nd:Sr$_5$(VO$_4$)$_3$F, Nd:YAB and Nd:X$_a$Z$_b$(BO$_3$)$_{(a+b)}$, where "X" is one element selected from Al, Y, Sc, and rare earth elements, where "Z" is one element selected from Al, Y, Sc, and rare earth elements and where "a" and "b" are integers or fractions.

9. The laser of claim 1 wherein said wavelength converting means is selected from the group of KTP, KDP, ADA, ADP, CDA, YAB, BBO, KNbO$_3$, LiNbO$_3$, LBO, CLBO, LIO and MTiO(XO$_4$), where "M" is at least one of K, Rb, Tl, Cs or NH$_4$, and where "X" is at least one of P or As.

10. The laser of claim 1 wherein said laser produces light at said second wavelength that is one of blue light and green light.

11. The laser of claim 1 further comprising:
an input mirror included as part of said first resonant cavity that substantially reflects said first laser radiation at said first wavelength and transmits resonant said optical pumping radiation;
an output mirror included as part of said second resonant cavity that substantially reflects said first laser radiation at said first wavelength and transmits resonant at least some of said second laser radiation at said second wavelength; and
wherein said common partially reflecting mirror partially reflects laser radiation at said first wavelength and partially transmits said first laser radiation at said first wavelength.

12. The laser of claim 11 wherein said input mirror further reflects said second laser radiation at said second wavelength and is formed on an input surface of said solid-state laser medium.

13. The laser of claim 11 wherein said output mirror is formed on an output surface of said optical wavelength converting means.

14. The laser of claim 1 further comprising:
an input mirror included as part of said first resonant cavity that has a reflectance between 99% and 100% at said first wavelength; and
an output mirror included as part of said second resonant cavity that has a reflectance between about 99% and 100% at said first wavelength.

15. The laser of claim 14 wherein said common partially reflecting mirror has a reflectance between about 3% and 98% at said first wavelength.

16. The laser of claim 14 wherein said common partially reflecting mirror has a reflectance between about 30% and 70% at said first wavelength.

17. The laser of claim 14 wherein said common partially reflecting mirror has a reflectance between about 15% and 80% at said first wavelength and is formed on an intermediate surface of said optical wavelength converting means, said intermediate surface of said optical wavelength converting means being adjacent to said solid-state laser medium.

18. The laser of claim 14 wherein said common partially reflecting mirror has a reflectance between about 15% and 80% at said first wavelength and is formed on an intermediate surface of said solid-state laser medium, said intermediate surface of said solid-state laser medium being adjacent to said optical wavelength converting means.

19. The laser of claim 14 wherein said common partially reflecting mirror includes an absorption layer.

20. The laser of claim 14 wherein said common partially reflecting mirror partially reflects said first laser radiation at said first wavelength and partially transmits said first laser radiation at said first wavelength and reflects said second laser radiation at said second wavelength.

21. The laser of claim 1 wherein said temperature controlling means is used to adjust said temperature of said first and second resonant cavities to produce a single longitudinal mode and said temperature controlling means is also used to adjust said temperature to produce multiple longitudinal modes of said laser, said laser being able to operate in a single or multiple longitudinal modes.

22. A frequency-doubled solid-state laser comprising:
a diode pumping source that produces optical pumping radiation;
a coupled resonant cavity including a first resonant cavity, a second resonant cavity and a common partially reflecting mirror shared between said first resonant cavity and said second resonant cavity, said first resonant cavity being defined by an input mirror and said common partially reflecting mirror, said second resonant cavity being defined by an output mirror and said common partially reflecting mirror;
a solid-state laser medium disposed within said first resonant cavity and being optically pumped by said optical pumping radiation, said solid-state laser medium generating a first laser radiation at a first wavelength in a single transverse mode;
an optical wavelength converting means disposed within said second resonant cavity that converts said first laser radiation at said first wavelength into a second laser radiation at a second wavelength, said common partially reflecting mirror being formed on an intermediate surface of one of said solid-state laser medium and said optical wavelength converting means; and
temperature controlling means for controlling temperatures of said first and second resonant cavities, wherein said first resonant cavity and said second resonant cavity are used for oscillating said first laser radiation at said first wavelength and wherein said common partially reflecting mirror partially reflects laser radiation at said first wavelength and partially transmits said first laser radiation at said first wavelength.

23. The laser of claim 22 wherein said optical wavelength converting means is a second harmonic generator that converts said first laser radiation at said first wavelength into the second harmonic laser radiation of said first laser radiation.

24. The laser of claim 22 wherein optical path lengths of said first resonant cavity and of said second resonant cavity are selected to provide a single longitudinal mode laser oscillating in said coupled resonant cavity.

25. The laser of claim 22 wherein the ratio of an optical path length of said second resonant cavity to an optical path length of said first resonant cavity is about a value selected from the group of 0.5, 1.5, 2.5, and 3.5.

26. The laser of claim 22 wherein the ratio of an optical path length of said first resonant cavity to an optical path length of said second resonant cavity is about a value selected from the group of 0.5, 1.5, 2.5, and 3.5.

27. A frequency-converted coupled resonant cavity used in a solid-state laser comprising:

a first resonant cavity having a first optical path length and including a solid-state laser medium used for generating a first laser radiation at a first wavelength;

a second resonant cavity having a second optical path length and including an optical wavelength converting means for converting said first laser radiation at said first wavelength into a second laser radiation at a second wavelength, wherein the ratio of said second optical path length to said first optical path length is about a value selected from the group of 0.5, 1.5, 2.5, 3.5, 4.5, 5.5, 6.5, 7.5, and 8.5; and a common partially reflecting mirror shared between said first resonant cavity and said second resonant cavity, said common partially reflecting mirror partially reflecting said first laser radiation at said first wavelength and partially transmitting said first laser radiation at said first wavelength.

28. The coupled resonant cavity of claim 27 wherein said common partially reflecting mirror has a reflectance between about 15% and 80% at said first wavelength.

29. The coupled resonant cavity of claim 27 wherein said common partially reflecting mirror has a reflectance between about 25% and 70% at said first wavelength.

30. The coupled resonant cavity of claim 27 wherein the ratio of said second optical path length to said first optical path length is about a value selected from the group of 0.5, 0.75, 1.5 and 2.

31. The coupled resonant cavity of claim 27 further comprising:

temperature controlling means for controlling the temperature of said first resonant cavity and of said second resonant cavity.

32. A coupled resonant cavity used in a single longitudinal mode frequency-converted solid-state laser comprising:

a first resonant cavity having a first optical path length and including a solid-state laser medium used for generating a first laser radiation at a first wavelength;

a second resonant cavity having a second optical path length and including an optical wavelength converting means for converting said first laser radiation at said first wavelength into a second laser radiation at a second wavelength, wherein the ratio of said second optical path length to said first optical path length is such that said laser operates in a single longitudinal mode; and a common partially reflecting mirror shared between said first resonant cavity and said second resonant cavity, said common partially reflecting mirror partially reflecting said first laser radiation at said first wavelength and partially transmitting said first laser radiation at said first wavelength.

33. The coupled resonant cavity of claim 32 wherein said first resonant cavity produces a plurality of first longitudinal modes having a first interval, wherein said second resonant cavity produces a plurality of second longitudinal modes having a second interval, and wherein said coupled cavity produces a plurality of coupled longitudinal modes having a coupled interval such that said coupled interval is the least common multiple of said first interval and said second interval whereby said laser operates in a single longitudinal mode.

34. The coupled resonant cavity of claim 33 further comprising:

temperature controlling means for controlling the temperature of said first resonant cavity and of said second resonant cavity.

35. The coupled resonant cavity of claim 32 further comprising:

temperature controlling means for controlling the temperature of said first resonant cavity and of said second resonant cavity.

36. The coupled resonant cavity of claim 32 wherein said optical path lengths of said first resonant cavity and of said second resonant cavity are selected such that the interval of longitudinal modes of said coupled resonant cavity is larger than one-half of the gain bandwidth of said solid-state laser medium.

37. The coupled resonant cavity of claim 36 further comprising:

temperature controlling means for controlling the temperature of said first resonant cavity and of said second resonant cavity.

38. A coupled resonant cavity used in a single longitudinal mode frequency-converted solid-state laser comprising:

a first resonant cavity having a first optical path length and including a solid-state laser medium used for generating a first laser radiation at a first wavelength;

a second resonant cavity having a second optical path length and including an optical wavelength converting means for converting said first laser radiation at said first wavelength into a second laser radiation at a second wavelength, wherein the ratio of said second optical path length to said first optical path length is such that said laser operates in a single longitudinal mode; and temperature controlling means for controlling the temperature of said first resonant cavity and of said second resonant cavity to adjust said first and second optical path lengths.

39. A single longitudinal mode, frequency-converted solid-state laser comprising:

an optical pumping source that produces optical pumping radiation;

a laser resonant cavity including a first resonant cavity and a second resonant cavity that share a common partially reflecting mirror, said laser resonant cavity receiving said optical pumping radiation;

a solid-state laser medium disposed within said laser resonant cavity and being optically pumped by said optical pumping radiation, said solid-state laser medium generating a first laser radiation at a first wavelength;

an optical wavelength converting means disposed within said laser resonant cavity for converting said first laser radiation at said first wavelength into a second laser radiation at a second wavelength; and a temperature controller for controlling the temperature of said first resonant cavity and said second resonant cavity, wherein said first resonant cavity and said second resonant cavity are used for oscillating said first laser radiation at said first wavelength and wherein optical path lengths of said first resonant cavity and of said second resonant cavity are selected such that only one longitudinal mode of said laser resonant cavity is within the gain bandwidth of said laser medium.

40. A single longitudinal mode, frequency-converted solid-state laser as recited in claim 39 wherein said laser resonant cavity is a coupled resonant cavity and wherein said solid-state laser medium is disposed within said first resonant cavity and wherein said optical wavelength converting means is disposed within said second resonant cavity.

* * * * *